United States Patent Office 3,564,017
Patented Feb. 16, 1971

1

3,564,017
BICYCLIC FURODIOXOLES
Alfred G. Robinson, Alden E. Blood, and Hugh J. Hagemeyer, Jr., Longview, Tex., assignors to Eastman Kodak Company, Rochester, N.Y., a corporation of New Jersey
No Drawing. Filed Feb. 12, 1969, Ser. No. 798,803
Int. Cl. C07d *13/08*
U.S. Cl. 260—340.9       10 Claims

---

ABSTRACT OF THE DISCLOSURE

Dialkyl-substituted derivatives of acetaldehyde react exothermically with glyoxal in the presence of an aqueous base to form bicyclic furodioxole ring compounds. For example, isobutyraldehyde and glyoxal in the presence of aqueous sodium carbonate react to form tetrahydro-2-isopropyl-6,6-dimethylfuro[2,3-d]-1,3-dioxol-5-ol. The bicyclic furodioxoles are valuable intermediates in the synthesis of polyols, which are themselves useful, for example, as intermediates in the preparation of alkyd resins, plasticizers for polyvinyl chloride compositions and as humectants.

---

This invention relates to novel hydroxy ethers and to a method of preparing the compounds. More particularly, the invention is directed to a novel class of bicyclic furodioxole compounds and their preparation.

The bicyclic furodioxole compounds of the instant invention have the following general formula:

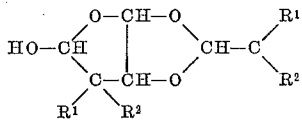

wherein $R^1$ and $R^2$ are the same or different and each of $R^1$ and $R^2$ are alkyl groups of 1 to 10 carbon atoms and preferably from 1 to 4 carbon atoms. The bicyclic furodioxole compounds of this invention are particularly useful as intermediates in the formation of such valuable materials as polyols. Polyols are widely used chemicals having a utility as humectants and as components of such valuable materials as alkyd resins and plasticizers for resinous materials such as polyvinyl chloride compositions.

The acid-catalyzed condensation of monosaccharides with carbonyl compounds, for example glucose and acetone, to form the bicyclic furodioxole ring system is known. Also well-known is the characteristic reaction of aldehydes in the presence of aqueous bases to undergo the aldol condensation to form hydroxy-aldehydes or unsaturated aldehydes.

We have discovered that, unexpectedly, bicyclic furodioxole ring compounds can be prepared by the reaction of dissimilar aldehydes in the presence of an aqueous base. The bicyclic furodioxole compounds of the invention can be prepared by contacting an aldehyde having a single alpha hydrogen atom and glyoxal in the presence of an aqueous base at a temperature between 10° C. and 50° C. The base-catalyzed aldehyde condensation to form the new bicyclic furodioxoles of the invention can be illustrated by the following equation:

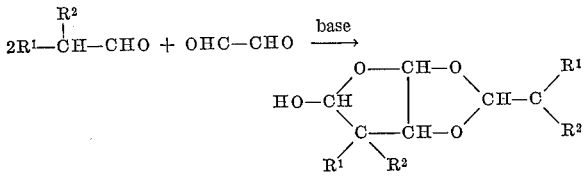

wherein $R^1$ and $R^2$ are as previously defined.

2

The base-catalyzed condensation of the aldehydes having a single alpha hydrogen atom and glyoxal to form the novel bicyclic furodioxole according to the process of this invention is effected by contacting an aqueous mixture of the aldehyde and glyoxal in a ratio of at least 2 moles of aldehyde per mole of glyoxal in the presence of an aqueous solution of alkali metal carbonate or alkali metal acetate at a temperature between 10° C. and 50° C. Although not necessary, the reaction is preferably conducted in an inert atmosphere, e.g., nitrogen. Air or oxygen are preferably excluded from the reaction system. The product can be recovered from the reaction mixture by any suitable means such as by vacuum distillation. A particular feature of the invention is the minimum formation of by-products, e.g., aldol condensation products.

Aldehydes suitable for use in the process of the invention are those having a single alpha hydrogen atom. These aldehydes can be considered as derivatives of acetaldehyde and can be represented by the formula:

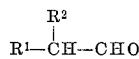

wherein $R^1$ and $R^2$ are the same or different and each of $R^1$ and $R^2$ are alkyl groups of 1 to 10 carbon atoms and preferably 1 to 4 carbon atoms. Representative aldehydes include isobutyraldehyde, 2-ethylbutyraldehyde, 2-methylpentaldehyde, and 2-ethylhexaldehyde. Isobutyraldehyde is a preferred reactant, condensing with glyoxal in the presence of the aqueous base according to the following equation to form tetrahydro-2-isopropyl-6,6-dimethylfuro-[2,3-d]-1,3-dioxol-5-ol:

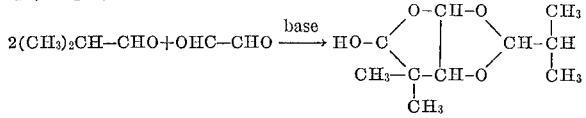

In carrying out the reaction, the aqueous base is usually added incrementally to an aqueous mixture of aldehyde and glyoxal. The reaction is exothermic and can be effected at temperatures between 10° and 50° C., preferably between 20° and 45° C. Suitable bases to effect the condensation include any alkali metal carbonate or acetate. The alkali metal carbonates and, in particular, potassium or sodium carbonate, are preferred catalysts. The concentration of the aqueous base is not critical and is generally employed in amounts of from 1 to 15 weight percent, preferably 3 to 8 weight percent, based on total charge. Good results are obtained by employing stoichiometric amounts of aldehyde and glyoxal, i.e., mole ratio of aldehyde:glyoxal of 2:1, although higher ratios can be employed. The reaction is preferably conducted in a stirred reactor to improve contact of the reactants and catalyst solution.

The bicyclic furodioxole compounds of the invention can be hydrogenated to produce polyols and monoalcohols corresponding to the aldehyde reactant. For example, tetrahydro - 2 - isopropyl - 6,6 - dimethylfuro-[2,3-d]-1,3-dioxol-5-ol can be hydrogenated to produce a novel polyol, 3,3-dimethyl-1,2,4-butanetriol and isobutanol. The polyols would have utilities similar to other polyols such as solvents, alkyd resin intermediates for coating compositions, polyesters and plasticizers for resinous materials such as polyvinyl chloride compositions. The monoalcohols such as isobutanol and 2-ethylhexanol are well-known articles of commerce.

The following examples are set forth for purposes of illustration, and it should be understood that they are not to be construed as limiting the invention in any manner.

EXAMPLE 1

To a stirred mixture in a nitrogen atmosphere consisting of 6000 ml. of water, 1800 g. (25 moles) of isobutyraldehyde and 1800 g. (12.4 moles) of glyoxal is added dropwise a solution of 450 g. of potassium carbonate dissolved in 450 g. of water. The time required for addition is 2 hours. As addition proceeds, the temperature increases from 24° C. to a maximum of 42° C. After addition is complete, the mixture is stirred for 4 additional hours. The resulting organic layer is separated from the reaction mixture. After washing once with its own volume of water, the crude product is heated to 50° C. at reduced pressure to remove water and unreacted aldehydes. The weight of isobutyraldehyde recovered is 263 g. The base product solidifies to give a white waxy solid, M.P. 57–59° C. The weight of the product obtained is 2020 g. (10 moles). The product structure assignment as tetrahydro - 2 - isopropyl-6,6-dimethylfuro-[2,3-d]-1,3-dioxol-5-ol is based on the following analytical data:

(1) *Analysis.*—Molecular weight Theory: 202. Found: 213.

(2) Elemental analyses.—Theory (percent): carbon, 59.5; hydrogen, 8.92. Found (percent): Carbon, 59.4; hydrogen, 8.77.

(3) NMR spectroscopy.—Consistent with structure assignment.

(4) IR spectroscopy.—Consistent with structure assignment.

(5) Percent hydroxy.—Theory: 8.4. Found: 8.5.

EXAMPLE 2

An experiment identical to that described in Example 1 is carried out except that sodium acetate is used in place of potassium carbonate and a 10-day reaction period is employed. Tetrahydro - 2 - isopropyl - 6,6 - dimethylfuro-[2,3-d]-1,3-dioxol-5-ol (776 g.) is obtained.

EXAMPLE 3

Hydrogenation of tetrahydro - 2 - isopropyl - 6,6 - dimethylfuro - [2,3 - d] - 1,3 - dioxol - 5 - ol to 3,3-dimethyl-1,2,4-butanetriol and isobutanol In a stainless steel 300 ml. stirred autoclave is placed 202 g. (1 mole) of tetrahydro - 2 - isopropyl - 6,6 - dimethylfuro - [2,3 - d] - 1,3 - dioxol - 5 - ol and 20 g. of Raney nickel. The hydrogenation is carried out for 4 hours using a temperature of 135° C. and 3000 p.s.i. of hydrogen. The reaction mixture is filtered to remove catalyst. Distillation of the residue gives 86 g. of isobutanol and 110 g. of a very viscous syrup. The syrup solidifies to give a white solid having a melting point of 67° C. after recrystallization from ether-acetone. This product is identified as 3,3 - dimethyl - 1,2,4 - butanetriol on the basis of the following analyses:

(1) *Analysis.*—Molecular weight Theory: 134. Found: 135.

(2) Elemental analyses.—Theory (percent): carbon, 53.73; hydrogen, 10.44. Found (percent): carbon, 53.89; hydrogen 10.26.

(3) NMR spectroscopy.—Consistent with structure assignment.

(4) IR spectroscopy.—Consistent with structure assignment.

Although the invention has been described in detail with particular reference to certain preferred embodiments thereof, it will be understood that variations and modifications can be effected within the spirit and scope of the invention as described hereinabove.

We claim:

1. A bicyclic furodioxole compound having the formula

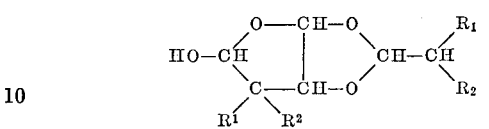

wherein $R^1$ and $R^2$ are the same or different and each of $R^1$ and $R^2$ are alkyl groups of 1 to 10 carbon atoms.

2. A compound according to claim 1 wherein $R^1$ and $R^2$ are alkyl groups of 1 to 4 carbon atoms.

3. Tetrahydro - 2 - isopropyl - 6,6 - dimethylfuro [2,3-d]-1,3-dioxol-5-ol.

4. A method for preparing bicyclic furodioxole compounds having the formula

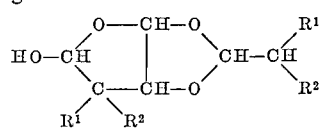

which comprises contacting glyoxal with an aldehyde of the formula

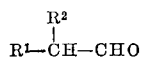

wherein $R^1$ and $R^2$ are the same or different and each of $R^1$ and $R^2$ are alkyl groups of 1 to 10 carbon atoms, in the presence of an aqueous base which is an alkali metal carbonate or alkali metal acetate at a temperature of from about 10° C. to about 50° C.

5. A process according to claim 4 wherein the amount of aqueous base is from 1 to 15 weight percent, based on total charge.

6. A process according to claim 5 wherein $R^1$ and $R^2$ each represents an alkyl group of 1 to 4 carbon atoms.

7. A process according to claim 6 wherein the temperature is from about 20° C. to about 45° C.

8. A process according to claim 7 wherein the amount of aqueous base is from 3 to 8 weight percent.

9. A process according to claims 4, 5, 6, 7, or 8 wherein said aqueous base is potassium carbonate or sodium carbonate.

10. A process according to claims 4, 5, 7, or 8 wherein said aldehyde is isobutyraldehyde and said aqueous base is potassium carbonate or sodium carbonate.

References Cited

Dahn et al., "Chemical Abstracts," vol. 49 (1955), col. 13209a, (Abstract of: Helv. Chim. Acta," vol. 37 (1954), pp. 1309–18).

ALEX MAZEL, Primary Examiner

J. H. TURNIPSEED, Assistant Examiner

U.S. Cl. X.R.

260—30.4, 88.3